Sept. 8, 1970 J. LOPEZ 3,527,460
SHEET CONVEYING, STACKING AND DISCHARGE EQUIPMENT
Filed Feb. 7, 1969 8 Sheets-Sheet 6

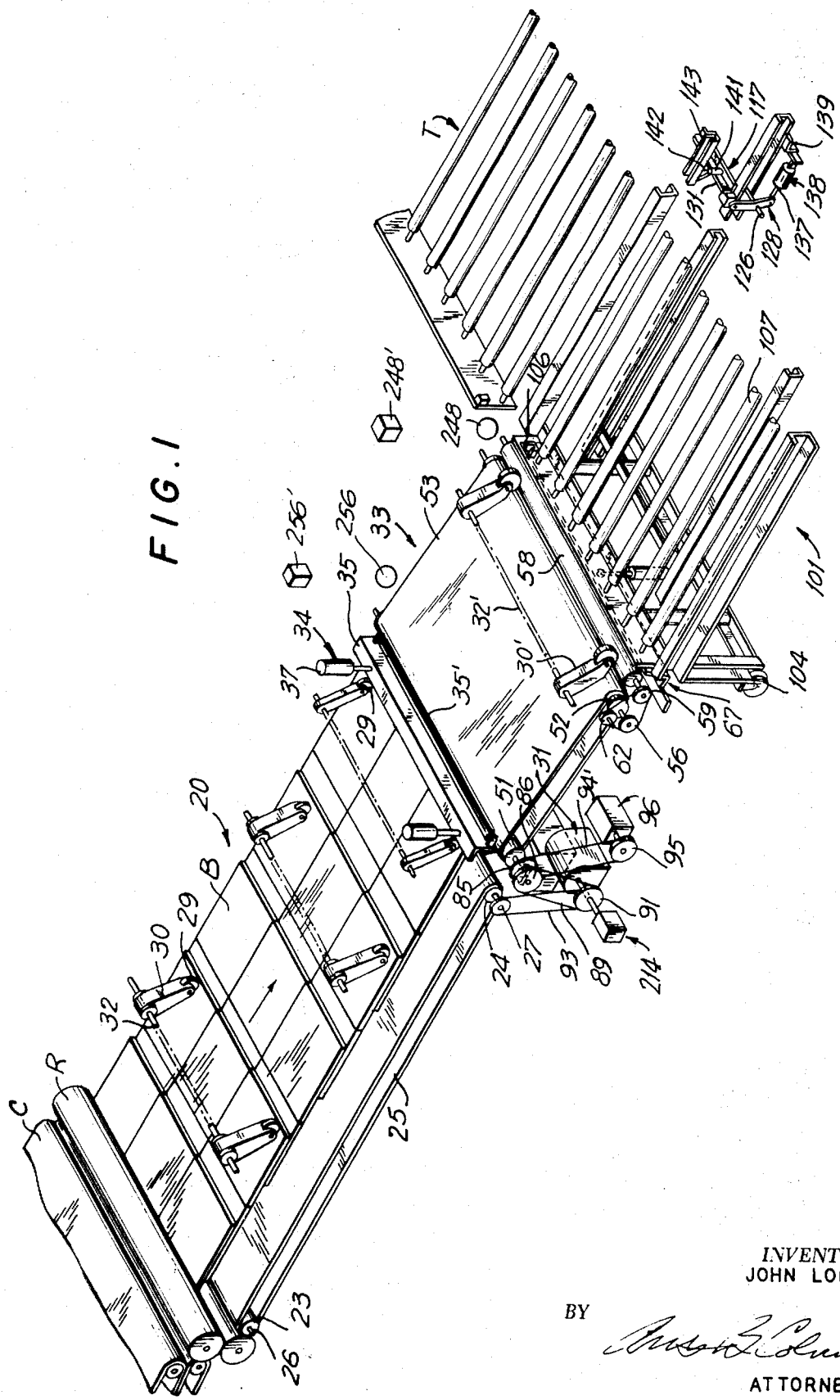

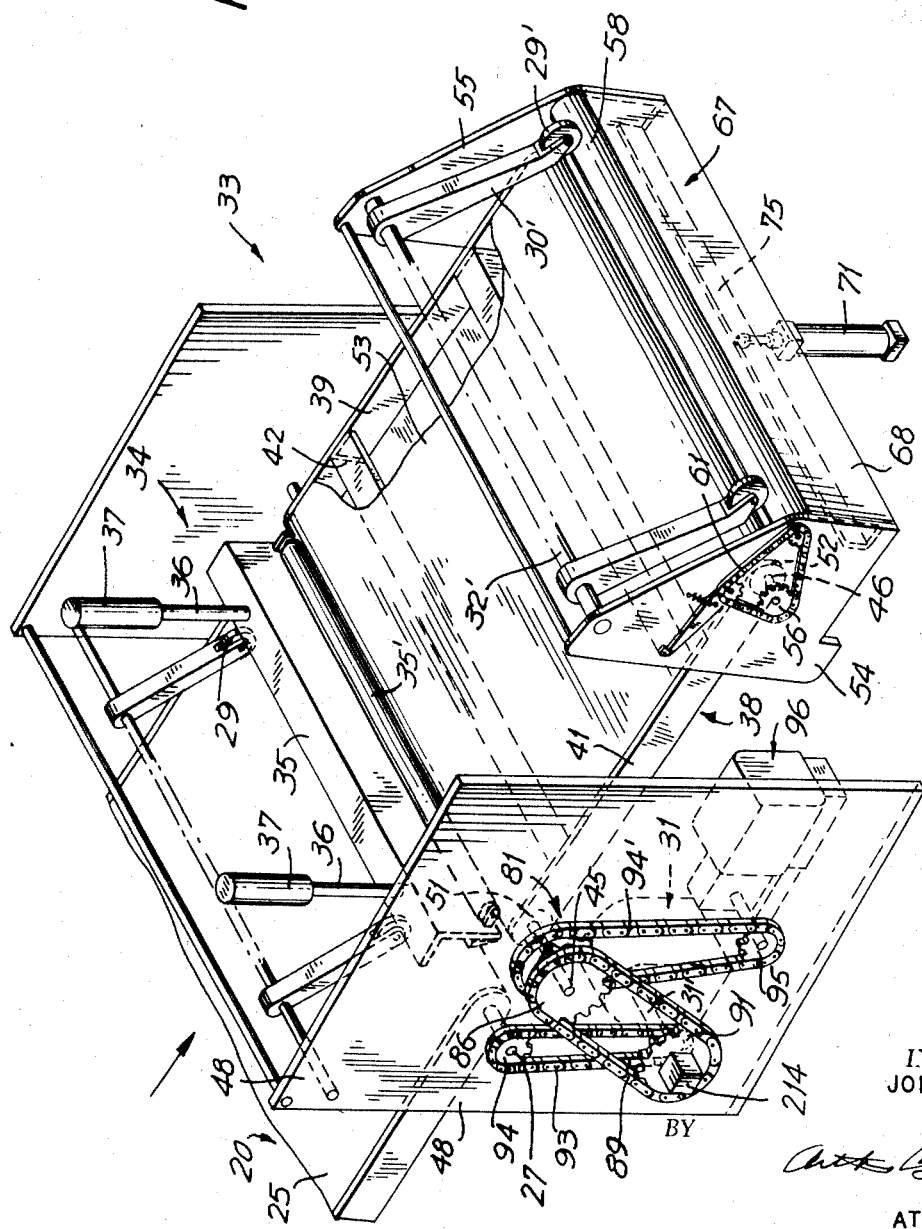

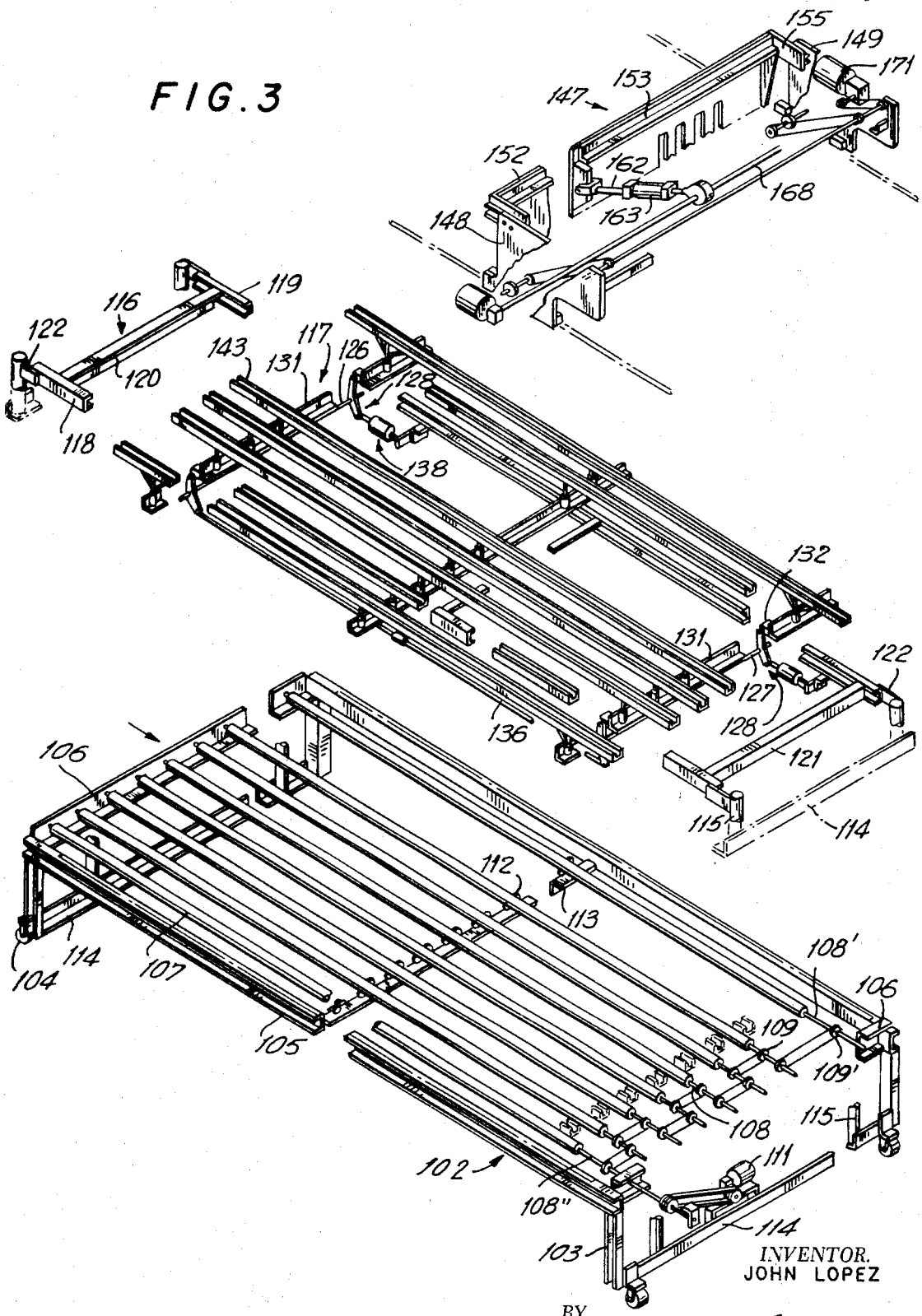

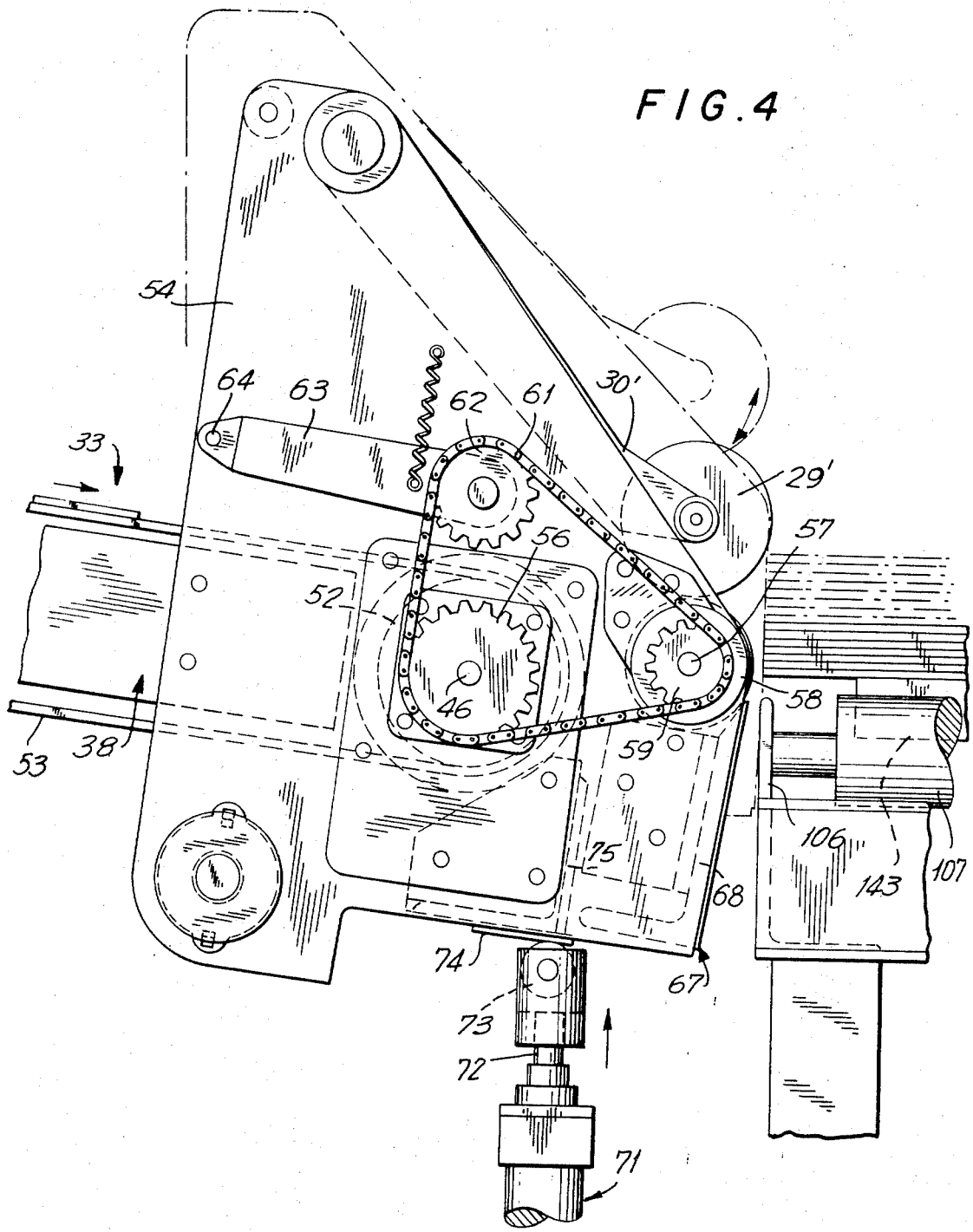

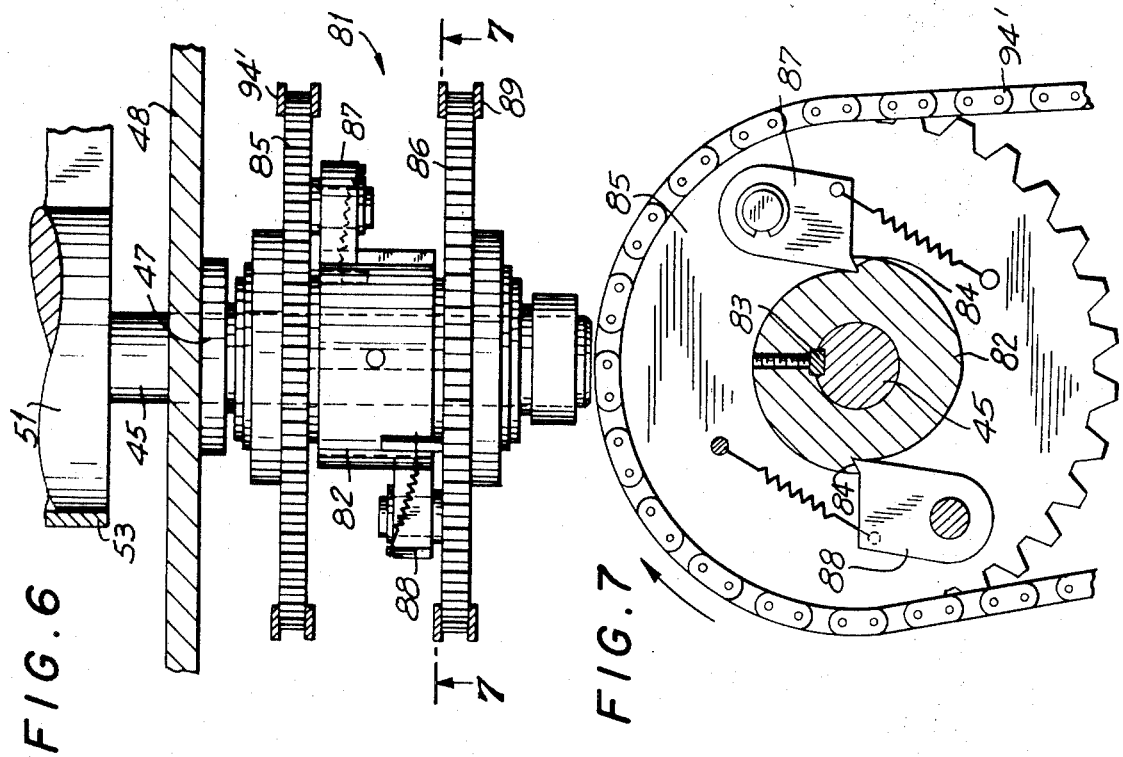
FIG. 6
FIG. 7
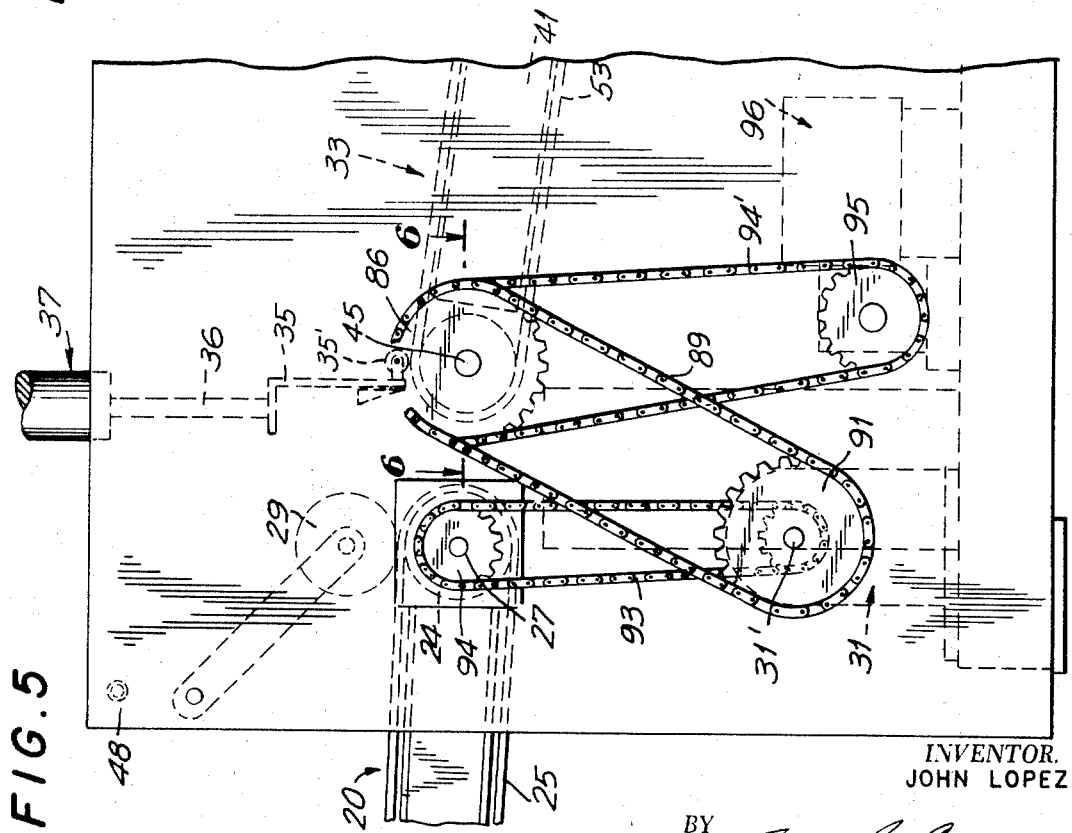
FIG. 5
INVENTOR.
JOHN LOPEZ
BY
ATTORNEY

INVENTOR.
JOHN LOPEZ
BY
ATTORNEY

Sept. 8, 1970 J. LOPEZ 3,527,460
SHEET CONVEYING, STACKING AND DISCHARGE EQUIPMENT
Filed Feb. 7, 1969 8 Sheets-Sheet 7

INVENTOR.
JOHN LOPEZ
BY
ATTORNEY

FIG. 11

United States Patent Office 3,527,460
Patented Sept. 8, 1970

3,527,460
SHEET CONVEYING, STACKING AND
DISCHARGE EQUIPMENT
John Lopez, Westfield, N.J., assignor to Universal Corrugated Box Machinery Corporation, Cranford, N.J., a corporation of New Jersey
Continuation-in-part of application Ser. No. 702,717, Feb. 2, 1968. This application Feb. 7, 1969, Ser. No. 797,566
Int. Cl. B65h 29/68
U.S. Cl. 271—69                     10 Claims

ABSTRACT OF THE DISCLOSURE

This invention relates to the art of sheet conveying, stacking and discharge equipment and more particularly to an equipment which will receive flat sheets of corrugated board which are individually delivered at a high rate of speed and thereupon slow down the rate of speed of such sheets without reducing their speed of delivery, and then will form uniform stacks of such sheets and discharge such stacks.

---

This application is a continuation-in-part of copending application Ser. No. 702,717, filed Feb. 2, 1968.

As conducive to an understanding of the invention, it is noted that in the formation of corrugated board, in the first stage of operation a conventional corrugator machine will form a continuous strip of corrugated board at a relatively high rate of speed.

The strip of corrugated board as it is discharged from the corrugator is passed through slitters and cutoff knives which form parallel longitudinal strips and then cut such strips transversely to form a plurality of individual rectangular sheets of the desired length and width.

Since the slitters and cutoff knives are synchronized with the corrugator, they will discharge the sheets at a high rate of speed.

Where the plurality of rectangular sheets which are in side by side relation, in substantially the same plane, are discharged onto a takeoff table, in order to form a plurality of stacks and such stacks are relatively large, so that the sheets discharged thereon must drop a considerable distance until the stack is built up, due to the surface area of the sheets, they tend to float as they move downwardly and will skew with the result that the adjacent stacks tend to interlock.

Where the plurality of stacks are removed from the takeoff table manually, if adjacent stacks should be interlocked the operation is extremely difficult for the workman, especially since the stacks are relatively heavy. As a result, a large number of workers would be required to handle the high rate of output and in addition due to the fact that the stacks would not be uniform, when loaded on pallets, for example, for transportation to subsequent processing equipment, the stacks would fall off the pallets with attendant delays in processing.

The problem of non-uniform stacks is enhanced when automatic equipment is to be used to handle the stacks built up on the takeoff conveyer as such equipment generally does not work satisfactorily with non-uniform stacks.

It is accordingly among the objects of the invention to provide a sheet conveying unit which is relatively simple in construction and which can receive sheets of corrugated board delivered thereto at a relatively high rate of speed and thereupon slow down the rate of advance of such sheets while still maintaining the same in longitudinal alignment and then discharge such sheets onto a suitable takeoff unit with assurance that the sheets thus discharged will remain in substantial alignment so that uniform stacks will be formed on such takeoff unit.

According to the invention, a conveyer unit is provided comprising an endless belt driven in timed relation with the slitting and cutoff machine, for example, but at a speed that is a fraction of such speed so that such sheets will be advanced by the conveyer in shingled relation.

The outlet end of the conveyer is provided with a gate mechanism having an auxiliary conveyer unit associated therewith, which receives the sheets advanced by the first conveyer and advances such sheets for discharge onto a takeoff unit. The gate mechanism includes a vertically movable gate beneath which the sheets will pass when the gate is lifted and which will restrain advance of the sheets when the gate is lowered.

Among the features of the invention are means to insure that the discharge of sheets from the conveyer onto the takeoff unit will be at a given minimum rate of speed regardless of the speed at which the conveyer is being driven to insure that the sheets that are discharged will not jam up at the outlet of the conveyer but will be dependably discharged onto the takeoff unit.

The takeoff unit is designed to receive the sheets as they are discharged from the conveyer unit and to form uniform stacks of such sheets. As the stacks build up, the auxiliary conveyer unit will pivot upwardly so that the sheets discharged from the outlet thereof will only be slightly above the plane of the topmost sheet that has been collected in the stack. As a result, the sheets discharged from the auxiliary conveyer will only have a short distance to fall onto the stacks so that floating of the sheet is minimized, thereby insuring uniformity of the completed stacks.

In the accompanying drawings in which is shown one of various possible embodiments of the several features of the invention, FIG. 1 is a side elevational view of the conveyer unit and takeoff unit;

FIG. 2 is a perspective view of the auxiliary conveyer;

FIG. 3 is an exploded schematic perspective view of the takeoff unit;

FIG. 4 is an enlarged fragmentary side elevational view showing the outlet end of the auxiliary conveyer unit;

FIG. 5 is a view similar to FIG. 4 showing the inlet end of the auxiliary conveyer;

FIG. 6 is a sectional view taken along line 6—6 of FIG. 5;

FIG. 7 is a sectional view taken along line 7—7 of FIG. 6;

FIG. 11 is a diagrammatic view of the control circuit for the equipment.

Figure 8:
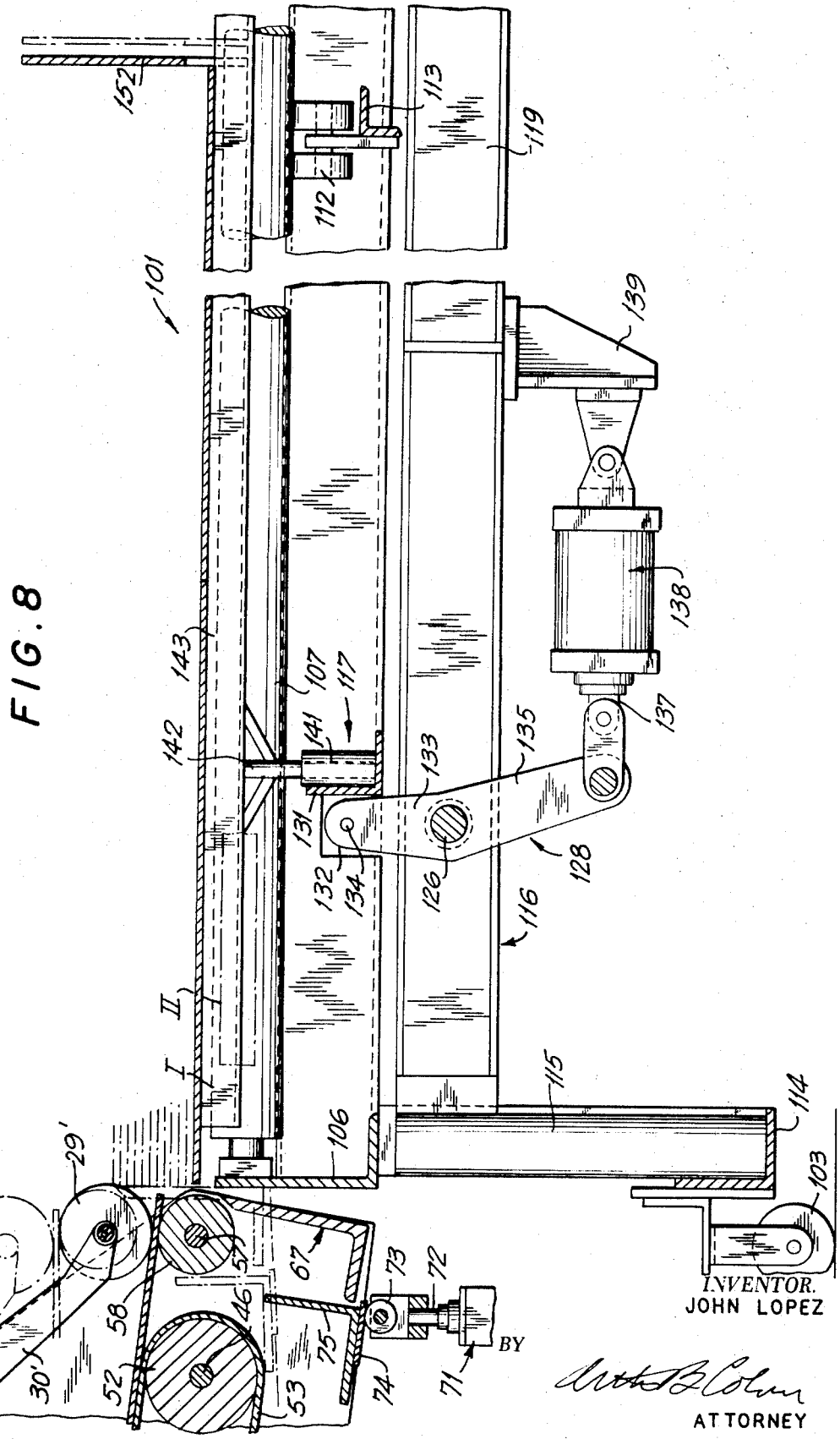
FIG. 8 is a transverse sectional view of the takeoff unit and outlet end of the auxiliary conveyer.

Referring now to the drawings, as shown in FIG. 1, the conveyor unit 20 comprises a pair of longitudinally spaced parallel rollers 23, 24 which mount an endless conveyor belt 25. The rollers 23, 24 are mounted on shafts 26, 27, the roller 23 illustratively being an idler roller and the roller 24 being driven by motor 31.

The conveyor 20 is associated with the outlet conveyer C of a sheet forming machine which has a pair of driven rollers R that discharge the sheets onto the conveyer belt 25.

The speed of the conveyer belt 25 is illustratively one-half that of the speed of the discharge rollers R. As a result, the sheets B will be shingled as they are advanced by the conveyer belt 25, being retained in position on such belts by the rollers 29 which are mounted on the ends of arms 30 pivotally mounted on transverse rods 32.

The conveyer belt 25, which is continuously driven, is designed to discharge the sheets B carried thereon onto an auxiliary conveyer unit 33 disposed at the outlet end of the conveyer belt 25, a gate assembly 34 being interposed between the outlet end of conveyer 20 and the inlet end of auxiliary conveyer 33.

As shown in FIGS. 1 and 5, the gate assembly 34 desirably comprises an angle bar or gate 35 suspended transversely of the conveyer 20 just ahead of the roller 24 and the associated holddown rollers 29. Gate 35 may be suspended by the armatures or piston rods 36 of a pair of solenoids 37 of any suitable type which may be mounted on the frame of the machine and is normally in raised position when the solenoids are energized.

The gate 35 carries a roller 35' at its lower edge extending parallel thereto with the lower periphery of the roller extending below such lower edge of the gate.

As is shown in FIG. 5, the axis of roller 35' is substantially vertically aligned with shaft 45 and the lower edge of the gate when it is lowered, is below the plane of conveyor belt 25. As a result, the gate 35 will interrupt delivery of the sheets B from conveyer belt 25 to conveyer 33.

As shown in FIGS. 2 and 4, the auxiliary conveyer 33 comprises a frame 38 comprising two parallel side beams 39 and 41 retained in spaced parallel relation by transverse angle beams 42. Each end of each of the side beams 39 and 41 has bearing openings through which extend shafts 45 and 46.

The shaft 45 extends through bearings 47 in opposed parallel supports or standards 48 which straddle the conveyer frame 38. Thus, the shaft 45 acts as a pivot mount for one end of the frame 38. The shafts 45, 46 each has secured thereto a roller 51 and 52, said rollers being encompassed by an endless conveyor belt 53.

Secured to the side beams 39 and 41 of frame 38 at the ends thereof adjacent the roller 52 are parallel support plates 54, 55. The shaft 46 is rotatably mounted in suitable bearings in said side plates 54, 55 and one end of said shaft 46 extends through the side plate 54 for example, and mounts a sprocket 56. Also mounted between the side plates 54, 55 forwardly of shaft 46 and roller 52 is a transverse shaft 57 to which is secured a roller 58. One end of the shaft 57 also extends beyond side plate 54 and mounts a sprocket 59. The sprockets 56 and 59 are encompassed by sprocket chain 61 which also rides around a takeup sprocket 62 rotatably mounted at one end of an arm 63 pivoted to side plate 54 as at 64 and normally spring urged upwardly to maintain the sprocket chain 61 under tension.

With the arrangement above described, it is apparent that the roller 58 will be driven by the drive imparted to roller 52 in the manner hereinafter described.

Associated with the roller 58 are a plurality of presser rollers 29' each rotatably mounted at one end of an arm 30' which in turn is pivoted on a shaft 32' extending transversely between the plates 54 and 55. The rollers 29' are substantially aligned with the roller 58 to exert pressure against a box blank passing therebetween.

Extending transversely between the forward edges of the plates 54, 55 beneath roller 58 is an angle bar 67, the vertical leg 68 of which serves as an abutment plate in the manner hereinafter to be described.

The frame 38 is pivoted by means of a hydraulic actuator 71, shown in FIG. 4 which has a vertical piston rod 72 carrying a roller 73 at its outer end designed to abut against a pad 74 mounted midway between the ends of an angle iron 75 extending transversely between the two side plates 54, 55 and rigidly secured thereto. Thus, upon energization of the hydraulic actuator, the frame will be pivoted upwardly about the shaft 45 which acts as the pivotal axis of the frame.

As shown in FIGS. 2, 6 and 7, one end of shaft 45 extends beyond support plate 48 and mounts a clutch assembly 81. As shown in FIG. 6, clutch 81 comprises a hub 82 secured to shaft 45 as by a key 83, the hub 82 having ratchet teeth 84 in its periphery. Freely rotatable on shaft 45 and straddling the hub 82 are sprocket wheels 85 and 86. Each of the sprocket weels 85, 86 pivotally mounts a pawl 87, 88, spring urged against the periphery of hub 82 as shown in FIG. 7.

Thus, the shaft 45 will be rotated by whichever of the sprocket wheels 85, 86 is driven at the greater speed.

In the embodiment shown, the sprocket wheel 86 is connected by sprocket chain 89 to sprocket wheel 91 carried by the shaft 31' of motor 31, said shaft mounting a sprocket wheel 92 connected by sprocket chain 93 to sprocket wheel 94 mounted on roller shaft 27. Thus, the speed of sprocket wheel 86 will be determined by the speed of motor 31 which also drives conveyer belt 25.

The sprocket wheel 85 is connected by sprocket chain 94' to sprocket wheel 95 which is driven by motor 96 at a fixed rate of speed.

Thus, referring to FIGS. 5, 6 and 7, if the speed of the motor 31 is such to rotate sprocket wheel 86 at a speed faster than that of sprocket wheel 85, it is apparent that the pawl 88 will engage ratchet tooth 84 and rotate the hub 82 and shaft 45 faster than it will be driven by ratchet wheel 85 and pawl 87.

If the speed of the motor 31 should fall below that of the sprocket wheel 85, when the sprocket wheel 85 and associated pawl 87 will take over so that the minimum speed will be that determined by the speed of rotation of sprocket wheel 85.

The auxiliary conveyer unit above described is designed to feed sheets of corrugated board onto the takeoff unit 101 for subsequent stacking and processing.

The takeoff unit 101 is designed not only to receive the sheets, but to form uniform stacks and to discharge such stacks in a direction at right angles to the direction in which they are initially discharged onto the takeoff unit.

As shown in FIG. 3 of the drawings, the takeoff unit comprises a lower frame member 102 having upstanding legs 103 at each corner mounted on rollers 104 with the top of the frame member being defined by parallel side beams 105 and end beams 106. Extending longitudinally of the frame 102 between the side beams 105 are spaced parallel rollers 107 mounted on shaft 108, which are supported in suitable bearings in the end beams 106.

As shown in FIG. 3, all of the shafts except the shafts 108" on one side of the frame and the shaft 108' on the other side of the frame, mount a pair of sprocket wheels 109, and the shafts 108" and 108' each mounts a single sprocket wheel 109'. The sprocket wheels 108 are interconnected by associated sprocket chains so that upon rotation of shaft 108" all of the rollers 107 will rotate simultaneously in the same direction.

In order to rotate said rollers, a motor 111 is provided mounted on the frame 102 and operatively connected to the shaft 108" to rotate the latter.

Desirably, in view of the length of the rollers 107 they are supported at their mid section by a pair of rollers 112 (FIGS. 3 and 8) mounted on a transverse support beam 113 positioned beneath said rollers 107.

The lower support beam 114 of the frame 102 mounts an upstanding post 115 near each corner which supports a carriage 116 that carries that slat frame 117 of the takeoff unit.

As shown in FIG. 3, the carriage 116 comprises two elongated spaced parallel side beams 118 and 119 between which are secured at each end transverse support beams 120 and 121. Each end of the side beams 118, 119 carries a longitudinally extending bracket 122, to the outer end of which is secured the upper end of an associated post 115.

Extending transversely between the side beams 118 and 119 of the carriage 116 inwardly spaced from the ends thereof are pivot shafts 126 and 127. Each of these shafts has a bell crank 128 secured thereto adjacent each of its ends. The upper legs of the bell cranks support the slat frame 117 shown in FIG. 8. The salt frame comprises a plurality of parallel angle bars 131 extending transversely with respect to the carriage 116. Secured to the rear of the angle bars near each end thereof is a block 132 to which the free end of the upper leg 133 of each bell crank 128 is pivotally connected as at 134. The free end of the lower leg 135 of the bell cranks 128 adjacent the side 118 of the carriage 116 are joined by a connecting rod 136.

The free ends of the lower legs 135 of the bell cranks 128 adjacent the side 119 of the carriage 116 are pivotally connected respectively to the piston rod 137 of an associated actuator 138, pivotally connected to a bracket 139 secured to side beam 119. Thus, upon energization of the actuators 138 and rotation of the associated bell cranks 128, the angle bars 131 will be moved in a clockwise and counterclockwise direction as the case may be.

Each of the angle bars has a plurality of upstanding sockets 141 spaced along the length thereof in which are mounted upstanding posts 142 to the upper ends of each longitudinally aligned pair of which are secured an elongated slat 143.

As is clearly shown in FIG. 8, the carriage 116 is positioned beneath the rollers 107 with the slats 143 extending upwardly between adjacent pairs of rollers 107 so that such slats may be moved from a position shown at I in which they are just slightly above the rollers to a position shown at II in which the upper edges of the slats are slightly below the upper plane of the rollers 107.

The takeoff unit has means provided to square the sheets of corrugated board discharged thereon.

Figures 9, 10:
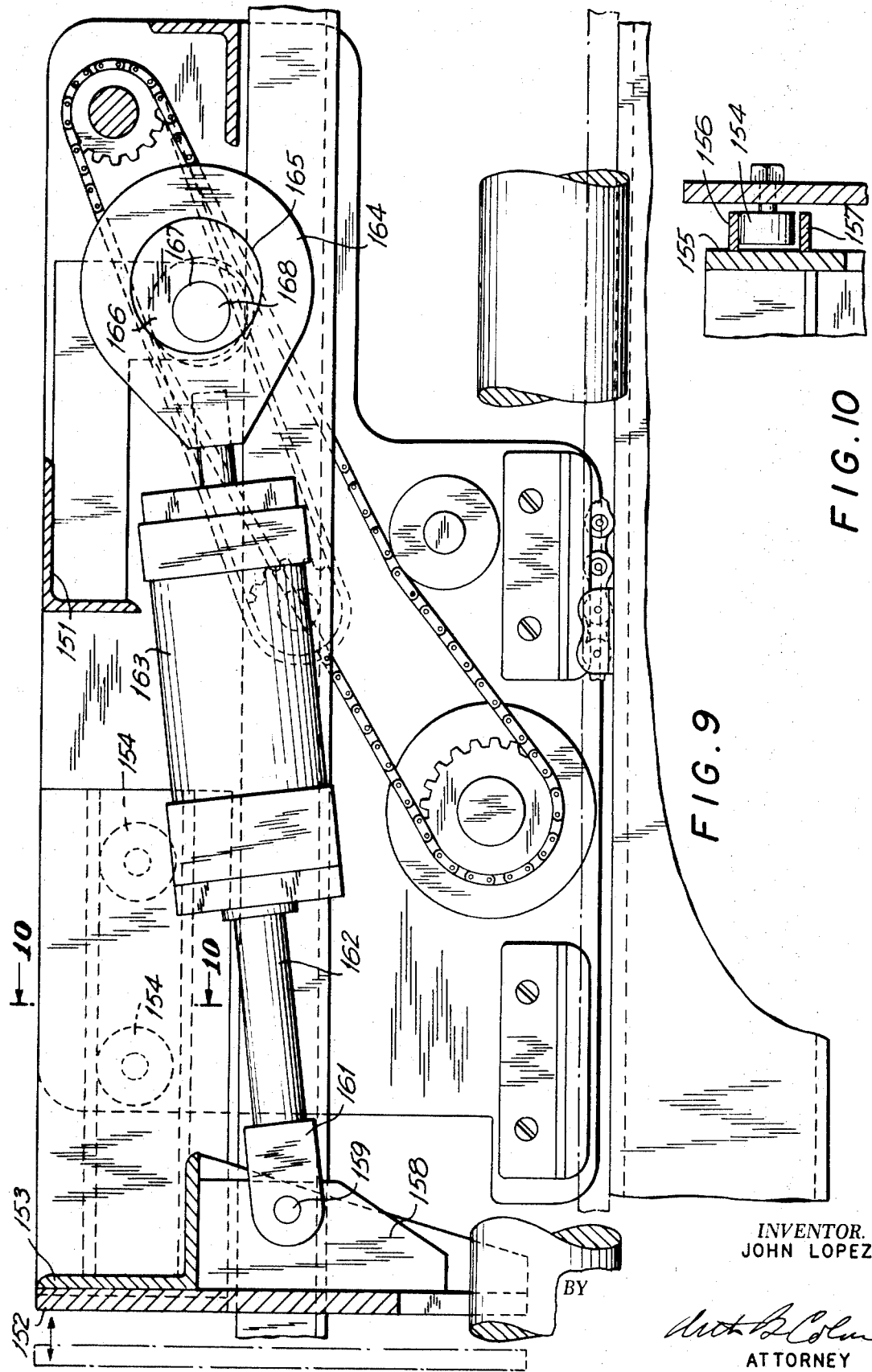
FIG. 9 is a transverse sectional view of the squaring assembly.
FIG. 10 is a sectional view taken along line 10—10 of FIG. 9.

As shown in FIGS. 3 and 9 for example, such means comprises a squaring assembly or carriage 147 which comprises a pair of spaced parallel side plates 148, 149 connected by transverse beams 151 to form a rigid unit. The carriage supports a squaring plate 152 illustratively rectangular as shown and having an angle beam 153 secured to the upper edge thereof.

As shown in FIGS. 3, 9 and 10, each of the side plates 148 and 149 on its inner surface adjacent its upper edge mounts a pair of longitudinally spaced rollers 154. Each end of the squaring plate 152 has a bar 155 secured thereto and extending rearwardly therefrom, each of said bars mounting on its outer surface a pair of vertically spaced elongated horizontal guide flanges 156 and 157. As shown in FIG. 10, the upper guide flange 156 rests on the rollers 154 and the lower guide flange 157 is slightly spaced from the undersurface of the rollers to prevent cocking of the squaring plate 152 as it is reciprocated in the manner now to be described to perform the squaring action.

As shown in FIG. 9, the squaring plate 152 has secured thereto on its rear surface an outstanding block 158 to which is pivotally connected as at 159 a clevis 161 connected to the piston rod 162 of a pneumatic actuator 163. The pneumatic actuator, as shown in FIG. 9, has its casing secured to a coupling member 164 which has a central bore 165 in which a bushing 166 is rotatably mounted, the bushing 166 having an off center opening 167 through which a drive shaft 168 extends eccentrically to mount said bushing, said bushing being secured to said drive shaft.

As shown in FIG. 3, the drive shaft 168 extends transversely through the side plates 148 and 149 and one end of said drive shaft is driven by a suitable motor 171. Thus, upon rotation of said shaft 168 by said motor, the bushing 166 will rotate in the opening 165 in coupling 164 to cause said coupling to be reciprocated and through the coupling and the pneumatic actuator 163 reciprocating the squaring plate 152.

The function of the actuator 163 is to retract the squaring plate 152 independently of the reciprocatory movement imparted thereto for the purpose hereinafter to be described.

Figure 11:
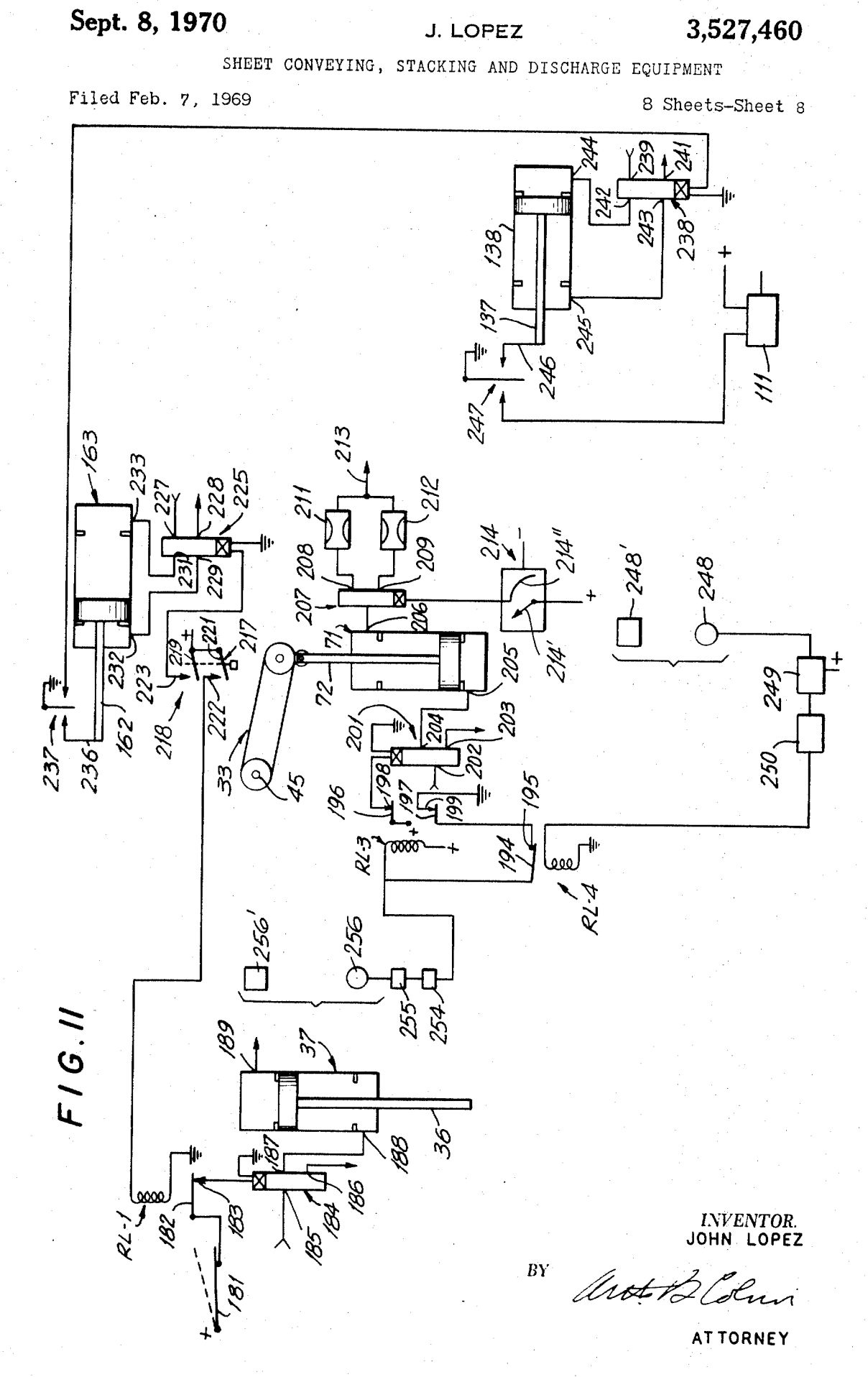

Although any suitable circuit can be used to control the sequence of operation of the equipment, an illustrative control circuit is shown in FIG. 11.

A switch 181 having its contact arm connected to a positive source, has its fixed contact connected to the contact arm 182 of a normally de-energized relay RL–1, said contact arm engaging a fixed contact 183 connected to the coil of an electro-magnetic valve 184.

The valve 184 has a pressure port 185 connected to a source of gas pressure for example; a vent port 186 and an outlet port 187. The port 187 is connected to the port 188 of gate actuators 37, the port 189 of said actuators being a vent port.

A photocell 256 and its associated source of light 256' are positioned in the path of the sheets discharged past the gate 35 onto the auxiliary conveyor 33 for the purpose hereinafter described. The photocell 256 is connected through amplifier 255 and pulsing unit 254 to one side of the coil of relay RL–3 and to the movable contact arm 194 of relay RL–4, which normally engages fixed contact 195 when the relay RL–4 is de-energized.

The relay RL–3 has a pair of contact arms 196, 197 which are normally spaced from associated fixed contacts 198, 199 when the relay is de-energized, the contacts 197, 199 forming holding contacts for relay RL–3. The contact arm 197 is connected to fixed contact 195 of relay RL–4 and the contact 199 is connected to ground. The contact arm 196 is connected to positive and the contact 198 is connected to the coil of an electro-magnetic valve 201.

The valve 201 has a pressure port 202 connected to a source of pressure; a vent port 203 and an outlet port 204. The port 204 is connected to the port 205 of auxiliary conveyor actuator 71, the port 206 of said actuator being a vent port.

The vent port 206 is connected to the inlet port of an electro-magnetic valve 207, the latter having two outlet ports 208, 209 connected through associated restrictors 211, 212 to vent line 213.

In normal position when valve 207 is not energized, the vent port 206 will be connected through restrictor 211 to vent line 213, the restrictor 211 being smaller than the restrictor 212 for slower flow of gas therethrough.

The valve 207 is controlled by a rotary switch 214, in turn controlled by the motor 31 so that when the conveyor 20 exceeds a predetermined speed, the valve 207 will connect the restrictor 212 in circuit for faster upward movement of the piston rod 72 of actuator 71 and hence faster upward pivotal movement of the auxiliary conveyor 33.

Associated with the auxiliary conveyor 33 are normally open switches 217, 218, the movable contact arms 219, 221 of which are ganged to move in unison and are normally spaced from associated fixed contacts 222, 223. Fixed contact 222 is connected to the coil of relay RL–1 and fixed contact 223 is connected to the coil of an electro-magnetic valve 225.

The valve 225 has a pressure port 227, a vent port 228 and two control ports 229, 231 connected to the ports 232, 233 of backstop actuator 163, the pressure port 227 being connected to the port 233 when the valve 225 is de-energized. The piston rod 162 of actuator 163 carries a fixed arm 236 adapted to close normally open switch 237 to complete a circuit to electro-magnetic valve 238. The valve 238 has a pressure port 239, a vent port 241 and two control ports 242, 243 connected to the ports 244, 245 of slat actuator 138, the pressure port 239 being connected to the port 245 when the valve 238 is de-energized. The piston rod 137 of actuator 138 carries a fixed arm 246 adapted to close normally open switch 247 to complete a circuit to drive motor 111 for the rollers 107 to rotate the latter.

In order to reset the system, a photocell 248 having an associated source of light 248' is connected through amplifier 249 to a pulsing unit 250 which will deliver a resetting pulse of desired duration to the coil of relay RL-4 after the light to the photocell 248 has been interrupted by a stack of sheets.

The photocell 248 and associated source of light are positioned as shown in FIG. 1 in the path of the stack of sheets discharged from the takeoff unit 101 to effect the resetting operation in the manner to be described.

OPERATION

According to one application of the invention, a corrugator equipment which forms a continuous strip of corrugated board, feeds such continuous strip to a slitting machine which forms parallel longitudinal strips and to a rotary knife which cuts transversely to form rectangular sheets of corrugated board which are of the length and width desired. The sheets are then fed onto the discharge conveyor C.

The speed of advance of the strip and the speed of the slitting and cutting machines are the same. The discharge conveyor C, as shown in FIG. 1, feeds through driven rollers R onto the shingling conveyor 20 which is driven by motor 31 in synchronization with the discharge conveyor C, but at about one-half the speed so that the conveyor belt 25 will be advanced at approximately one-half the speed of the discharge conveyor C for shingling of the sheets as shown in FIG. 1.

When the equipment is turned on, by closing of switch 181 (FIG. 11) a circuit will be completed through normally closed contacts 182, 183 to the valve 184 to connect its ports 185, 187, thereby applying gas pressure to actuators 37 to raise the gate 35 to its open position. At this time, the valve 225 controlling the oscillating backstop 147 (FIG. 3) will be de-energized so that the pressure port 227 will be connected to control port 231 thereby causing the piston rod 162 to be extended. In addition, the slat carrier 117 will be in its raised position shown at I in FIG. 8 inasmuch as the valve 238 (FIG. 11) will be deenergized, connecting the pressure port 239 to control port 243 thereby retracting the piston rod 137 of the slat carrier actuators 138. The drive motor 111 for the rollers 107 will also be de-energized.

As the shingled sheets are successively discharged by the shingling conveyer 20 past the open gate 35, they will interrupt the light to the photocell 256 and through amplifier 255 and pulsing unit 254 energize relay RL-3 causing its contacts 196, 198 and 197, 199 to close. Closing of contacts 197, 199 will complete a holding circuit for relay RL-3 through normally closed contacts 194, 195 of de-energized relay RL-4. Closing of contacts 196, 198 will energize valve 201 to connect the source of gas pressure to port 205 of auxiliary conveyer actuator 71. As a result, the piston rod 72 of actuator 71 will start to rise, thereby pivoting the auxiliary conveyor upwardly about its pivot shaft 45. The vent port 206 of said actuator 71 is connected through valve 207 to restrictor 211 and then to vent line 213, said restrictor 211 permitting controlled upward movement of the auxiliary conveyer 33 at a desired rate of speed. In the event that the motor 31 driving the shingling conveyer 20 should increase its speed due to the speedup of the corrugator with which it is synchronized, if such speedup should exceed a predetermined amount, the rotary switch arm 214' will engage contact 214" to actuate the valve 207 to connect the restrictor 212 into circuit. The restrictor 212 will permit more rapid flow of gas therethrough for faster upward pivotal movement of the conveyer 33. This action is important since it insures that the outlet end of the pivoted auxiliary conveyer 33 will always be in a plane above that of the topmost sheet in each of the stacks of sheets being formed on the takeoff conveyer.

The sheets will thus be ejected onto the raised slats 143 on the takeoff unit 101 abutting against the backstop 152 thereof (FIG. 8) which is oscillating by reason of the drive imparted thereto from shaft 168. Since the outlet end of the auxiliary conveyer 33 is rising at a controlled speed, the successive sheets will be discharged onto the sheets thus far collected on the takeoff unit in a plane just slightly above the plane of the topmost sheet in the stack being formed, so that there will be substantially no downward floating action which could displace the sheets to form irregular stacks.

By reason of the action of the oscillating backstop 152, which will move the sheets against the squaring bar 67 carried by the auxiliary conveyer 33 at its outlet end, the stacks formed on the takeoff unit 101 will be squared and hence uniform (FIG. 8). When the auxiliary conveyer 33 has pivoted to its uppermost position, at which time stacks of desired height will be formed on the takeoff unit 101, the switches 217 and 218 will be closed. Closing of switch 217 will complete a circuit to relay RL-1 to open its contacts 182, 183 thereby breaking the circuit to valve 184 so that the pressure source to port 185 will be cut off and port 187 connected through port 186 to vent. As a result, due to the weight of the gate 35, it will fall by gravity to closed position to stop further discharge of sheets onto the auxiliary conveyer 33.

The closing the switch 218 will energize valve 225 to connect the source of pressure applied to port 227, to port 229 to retract the piston rod 162 and hence retract the backstop 152 to move the latter away from the adjacent edges of the stacks thus formed thereby preventing interference by the backstop with subsequent discharge of the stacks from the takeoff unit 101. Retraction of piston rod 162 will cause switch 237 to close to complete a circuit to valve 238, connecting the pressure port 239 thereof to port 244 of the slat carrier actuator 138. As a result, the piston rods 137 of said actuators 138 will be extended thereby pivoting the bell cranks 128 in a clockwise direction from the position shown in FIG. 8. This will cause the slats 143 to move downwardly and to the right from the position shown at I, to the position shown at II where the slats 143 are below the plane of the rollers 107.

Thus, the stacked sheets will be deposited onto the rollers 107 and the edges of the sheets will be moved away from the squaring bar 67 carried by the auxiliary conveyer 33 so that there will be no interference with the discharge of the stacks from the takeoff unit 101.

When the piston rods 137 of actuators 138 are fully extended, the fixed arm 246 carried by one of said piston rods will close switch 247 to complete a circuit to motor 111 to energize the latter to effect rotation of the rollers 107. Thus, the stacks will be advanced by the rollers 107 away from the discharge outlet of auxiliary conveyer unit 33 in direction at right angles thereto.

The stacks are moved by such rollers onto a conventional receiving table T adjacent the rollers. As shown in FIG. 1, as the leading edge of the stacks starts to move off the takeoff unit 101 it will interrupt the light to photocell 248. When the trailing edge of said stacks passes the photocell 248, which is again energized by the source of light, a pulse of predetermined duration is delivered by conventional pulsing unit 250 to reset the equipment.

Thus, a pulse would be delivered to relay RL-4 momentarily to open its contacts 194, 195, thereby breaking the holding circuit to relay RL-3 which will be deenergized, cutting off the source of pressure and connecting port 204 of valve 201 through port 203 to exhaust. As a result, the auxiliary conveyer 33 will pivot downwardly by gravity, causing switches 217 and 218 to open. Opening of switch 218 will de-energize valve 225 causing the latter to reverse so that the piston rod 162 thereof will be extended to advance the backstop 152. In addition, switch 237 will open to break the circuit to valve 238 causing the latter to reverse so that piston rod 137 will be retracted to raise the slat carrier to the position shown at I, (FIG. 8) in which it is above the plane of the rollers. In addition, switch 247 will open to break the circuit to motor 111 so that the rollers 107 will stop rotating.

Opening of switch 217 causes relay RL-1 to be deenergized so that contacts 182, 183 will again close to energize valve 184 so that the cycle will be repeated. Thus, when valve 184 is energized, the gate will immediately be lifted and the cycle will repeat.

As previously described, the shaft 45 of the auxiliary conveyer 33 is driven at a minimum speed determined by the speed of rotation of sprocket wheel 85 by motor 96 and at a maximum speed determined by the speed of rotation of sprocket wheel 86 which is driven by the motor 31 which is synchronized with the speed of the corrugator. Thus, in the event that for some reason the corrugator should be slowed down so that the speed of discharge of sheets from the discharge conveyer C should also be slowed down, due to the clutch 81, previously described, there is assurance that at all times the sheets will be discharged from the auxiliary conveyer 33 at a speed no less than a predetermined amount, to insure that the sheets will be ejected at a sufficiently high rate of speed to move across the width of the takeoff unit against the oscillating backstop to prevent jamming.

In the event the speed of the shingling conveyer 20 should increase beyond a predetermined amount, it is apparent that a greater number of sheets would be discharged onto the auxiliary conveyer 33 in a given period of time and the stacks would build up faster on the takeoff unit 101. Since it is essential that the outlet of the auxiliary conveyor 33 always be in a plane above the plane of the topmost sheet in the stack to permit discharge of sheets onto the stacks, the speed of the upward pivotal movement of the auxiliary conveyer 33 is controlled, as previously described, by the rotary switch 214 operatively connected to the motor 31, which will connect the restrictor 212 in circuit in the event of speedup to insure more rapid rise of the auxiliary conveyer.

With the equipment above described, sheets of corrugated board fed at a relatively high rate of speed may be dependably assembled into uniform stacks without any need for manual handling.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Apparatus for conveying and stacking flat sheets comprising a feeding conveyer having an inlet end and an outlet end, a takeoff conveyer having an inlet end and an outlet end, said conveyers being disposed in association with each other, means for continuously advancing said feeding conveyer, said takeoff conveyer being positioned to effect movement of sheets discharged thereon in direction at right angles to the direction of feed of such feeding conveyer, means for advancing said takeoff conveyer, a gate positioned adjacent the outlet end of said feeding conveyer and adapted to interrupt feed of the sheets therefrom when in closed position, an auxiliary conveyer positioned between the outlet end of said feeding conveyer and the inlet of said takeoff conveyer and located in advance of said gate, said auxiliary conveyer having an inlet end adjacent the outlet end of the feeding conveyer and an outlet end adjacent the inlet end of the takeoff conveyer, a vertical bar positioned adjacent said outlet end of said auxiliary conveyer and carried thereby, said takeoff conveyer having a vertical plate associated therewith, extending parallel to and spaced from said vertical bar, means to oscillate said vertical plate to square the stack of sheets on said takeoff conveyer between said bar and said plate, means pivotally to mount said auxiliary conveyer at its inlet end on an axis extending transversely of the outlet end of the feeding conveyer, means to pivot said auxiliary conveyer between a lowermost position and an uppermost position, to raise its outlet end with respect to the plane of said takeoff conveyer, and means when a stack of desired height has been formed on said takeoff conveyer, to close said gate to interrupt further discharge of sheets onto said auxiliary conveyer and means after said gate has been closed to effect movement of said stack of sheets from said takeoff conveyer.

2. Apparatus for conveying and stacking flat sheets comprising a feeding conveyer having an inlet end and an outlet end, a takeoff conveyer having an inlet end and an outlet end, said conveyers being disposed in association with each other, means for continuously advancing said feeding conveyer, said takeoff conveyor being positioned to effect movement of sheets discharged thereon in direction at right angles to the direction of feed of such feeding conveyer, means for advancing said takeoff conveyer, a gate positioned adjacent the outlet end of said feeding conveyer and adapted to interrupt feed of the sheets therefrom when in closed position, an auxiliary conveyer positioned between the outlet end of said feeding conveyer and the inlet of said takeoff conveyer and located in advance of said gate, said auxiliary conveyer having an inlet end adjacent the outlet end of the feeding conveyer and an outlet end adjacent the inlet end of the takeoff conveyer, means pivotally to mount said auxiliary conveyer at its inlet end on an axis extending transversely of the outlet end of the feeding conveyer, means to pivot said auxiliary conveyer between a lowermost position and an uppermost position, to raise its outlet end with respect to the plane of said takeoff conveyer, said takeoff conveyer having a stack receiving member extending in a plane slightly below the plane of the outlet end of the auxiliary conveyer when the latter is in its lowermost position, a vertical squaring bar carried by said auxiliary conveyer adjacent its outlet end and extending transversely thereacross, said takeoff conveyer having a vertical plate associated therewith, extending parallel to and spaced from said vertical squaring bar, said bar being opposed to said plate between the two extreme positions of movement of said auxiliary conveyer, means to oscillate said vertical plate to cause the latter to abut against one edge of the sheets in said stack to move the opposed edge of such sheets into abutment with said vertical squaring bar to square the stack of sheets on said takeoff conveyer, and means when a stack of desired height has been formed on said takeoff conveyer, to close said gate to interrupt further discharge of sheets onto said auxiliary conveyer and means after said gate has been closed to effect movement of said stack of sheets from said takeoff conveyer.

3. The combination set forth in claim 2 in which said takeoff unit comprises a rectangular frame, a plurality of spaced parallel rollers mounted on said frame and lying in a horizontal plane, drive means operatively connected to said rollers to rotate the latter in unison, a plurality of spaced parallel elongated support bars defining said stack receiving member, extending parallel to said rollers in a horizontal plane and adapted to be moved in unison vertically between said rollers from a plane above the plane of the top surface of said rollers to a plane below the plane of the top surface of said rollers, said vertical plate extending transversely across said rollers and said support bars and above the same, said oscillating means reciprocating said plate in direction longitudinally of said rollers and said support bars.

4. The combination set forth in claim 3 in which means are provided to effect slight longitudinal movement of said plate independent of the reciprocatory movement imparted thereto.

5. The combination set forth in claim 3 in which means are provided simultaneously to effect movement of said support bars with both a longitudinal and vertical component of movement.

6. The combination set forth in claim 3 in which means are provided to effect movement of said stack receiving member below the plane of the top surface of said rollers when said auxiliary conveyer has reached its uppermost position.

7. The combination set forth in claim 3 in which means are provided to effect movement of said stack receiving member below the plane of the top surface of said rollers when said auxiliary conveyer has reached its uppermost position, and means to energize said roller drive means after said stack receiving member has moved below the plane of the top surface of said rollers.

8. The combination set forth in claim 2 in which a discharge roller is carried by said auxiliary conveyer and extends transversely across the outlet end thereof in the path of movement of the sheets discharged from the latter, the top surface of said roller being in a plane above the upper edge of said squaring bar, and means to rotate said discharge roller at the same rate of speed as said auxiliary conveyer.

9. The combination set forth in claim 8 in which a shaft extends transversely between said auxiliary conveyer at its outlet end and a plurality of spaced parallel arms are pivotally mounted at one end on said shaft, each of said arms carrying a roller at its free end substantially vertically aligned with said discharge roller.

10. Apparatus for conveying and stacking flat sheets comprising a feeding conveyer having an inlet end and an outlet end, a takeoff conveyer having an inlet end and an outlet end, said conveyers being disposed in association with each other, means for continuously advancing said feeding conveyer, said takeoff conveyer being positioned to effect movement of sheets discharged thereon in direction at right angles to the direction of feed of such feeding conveyer, means for advancing said takeoff conveyer, a gate positioned adjacent the outlet end of said feeding conveyer and adapted to interrupt feed of the sheets therefrom when in closed position, an auxiliary conveyer positioned between the outlet end of said feeding conveyer and the inlet of said takeoff conveyer and located in advance of said gate, said auxiliary conveyer having an inlet end adjacent the outlet end of the feeding conveyer and an outlet end adjacent the inlet end of the takeoff conveyer, means pivotally to mount said auxiliary conveyer at its inlet end on an axis extending transversely of the outlet end of the feeding conveyer, means to pivot said auxiliary conveyer between a lowermost position and an uppermost position, to raise its outlet end with respect to the plane of said takeoff conveyer, said feeding conveyer comprising a pair of spaced parallel rollers, an endless conveyer belt encompassing said rollers, a shaft mounting the roller adjacent the outlet of the feeding conveyer, drive means operatively connected to said shaft to rotate the latter and said conveyer belt, said auxiliary conveyer comprising a pair of spaced parallel rollers, an endless conveyer belt encompassing said rollers, a shaft mounting one of said rollers, a clutch mounted on the shaft of said auxiliary conveyer, said clutch comprising a fixed member secured to said shaft and two members rotatably mounted on said shaft, means operatively connecting one of said rotary members to the drive means of said feeding conveyer to be driven thereby, means operatively connected to the other rotary member to rotate the latter, means operatively connecting said fixed member to whichever of the rotary members that is driven at the greater speed, to rotate said fixed member and the shaft of said auxiliary conveyer to advance the latter, and means when a stack of desired height has been formed on said takeoff conveyer, to close said gate to interrupt further discharge of sheets onto said auxiliary conveyer and means after said gate has been closed to effect movement of said stack of sheets from said takeoff conveyer.

References Cited
UNITED STATES PATENTS 2,506,550   5/1950   Morrison   271—69
2,660,432   11/1953   Wilske   271—68

RICHARD E. AEGERER, Primary Examiner

U.S. Cl. X.R.

198—20